(12) United States Patent
Bohne et al.

(10) Patent No.: US 6,914,415 B2
(45) Date of Patent: Jul. 5, 2005

(54) BATTERY ADAPTOR TO FACILITATE RECONDITIONING IN A SMART CHARGER

(75) Inventors: William C Bohne, Lawrenceville, GA (US); Bradley E. Long, Lilburn, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/366,871

(22) Filed: Feb. 14, 2003

(65) Prior Publication Data

US 2004/0160210 A1 Aug. 19, 2004

(51) Int. Cl.$^7$ ................................................ H02J 7/00
(52) U.S. Cl. ........................................ 320/114; 320/107
(58) Field of Search .............................. 320/114, 107, 320/106, 109, 110, 112, 113, 115, 128, 133, 134, 136, 137, 155, 132; 307/48

(56) References Cited

U.S. PATENT DOCUMENTS 3,938,021 A  *  2/1976  Kosmin ...................... 320/148
6,456,037 B1 *  9/2002  Jakl et al. ................... 320/106

FOREIGN PATENT DOCUMENTS

TW            451541 A  *  8/2001  ............. H02J/7/00

OTHER PUBLICATIONS

Motorola Impres Charging System http://www.motorola.com/ies/ESG/impres1.html Jan. 21, 2003.
Cadex Universal Battery Adapters www.cadex.com/prod__smart.ASP www.cadex.com/prod__C7000.ASP www.cadex.com/Download/UBA–specsheet–8–Email.PDF Nov., 2001.

* cited by examiner

Primary Examiner—Donald Sparks
Assistant Examiner—Lawrence Luk
(74) Attorney, Agent, or Firm—Philip H. Burrus, IV

(57) ABSTRACT

This invention includes an adaptor that facilitates reconditioning and charging of non-smart batteries in smart chargers. The adaptor includes a mechanical and electrical interface to the host-side of a non-smart battery, thereby bypassing any protection diode. The adaptor further includes at least one memory device that identifies the adaptor to a smart charger as an adaptor. Upon insertion, the smart charger reads the memory device in the adaptor begins the reconditioning process. The reconditioning process includes discharging the non-smart battery to a predetermined voltage stored memory device. The smart charger then waits a predefined period and begins charging the non-smart battery, preferably at a constant current. Charging is terminated at a V-peak inflection. Upon completion of charging, the smart charger may trickle charge for a time, and then indicates charge is completed.

6 Claims, 4 Drawing Sheets

BATTERY ADAPTOR TO FACILITATE RECONDITIONING IN A SMART CHARGER

BACKGROUND

1. Technical Field

This invention relates generally to reconditioning rechargeable batteries, and more specifically to an adaptor for a non-smart battery that facilitates reconditioning in a smart charger.

2. Background Art

When a nickel-based rechargeable battery is placed in a charger before it is completely discharged, it may lose some of its capacity due to a phenomenon known as the "memory effect". In other words, if a battery is repeatedly placed in a charger prior to being completely "dead", the battery will "die" more and more quickly in the future. In some cases, a fully charged battery that originally lasted for four hours might die after only one hour.

This memory effect, or voltage depression, is particular to nickel chemistry batteries. In nickel batteries, the storage capacity—or in technical terms the "energy versus time curve"—changes based upon discharge patterns. The good news is that the memory effect can be nearly eliminated by fully discharging the battery at a nominal current. This type of full discharge is called "reconditioning".

To keep a battery at original capacity, the battery needs to be reconditioned whenever the discharge time, i.e. the usable time of the battery, has become reduced. Commonly assigned U.S. Pat. No. 6,433,511, entitled "Method and Apparatus for Manually Reconditioning a Battery Without a Switch", incorporated herein by reference in its entirety, teaches a "smart" charger that automatically reconditions batteries at the appropriate time. (The term "smart" refers to a charger with a microprocessor, wherein the microprocessor is capable of reading data from the battery pack and making charging decisions based upon that data.) The smart charger in the '511 patent also allows manual reconditioning by rapidly removing and reinserting the battery into the charger.

The system of the '511 patent works well so long as the battery that is inserted into the charger includes at least a memory device with which the smart charger can communicate. A memory device alerts the charger as to battery type and state of charge, as well as telling the charger that a reconditioning path is present in the battery (some batteries include blocking diodes that prevent reconditioning). If there is no memory device in the battery, the charger will not be able to properly recondition the battery.

Smart batteries and chargers are relatively new devices. Consequently, many batteries on the market are simply that: batteries. They include no microprocessors, no fuel gauging circuitry and no memory devices. As such, they are not capable of being reconditioned in a smart charger. Such batteries therefore are very susceptible to memory effects.

Therefore a need exists for a means of reconditioning non-smart batteries in smart chargers.

DETAILED DESCRIPTION OF THE INVENTION

Figure 1:
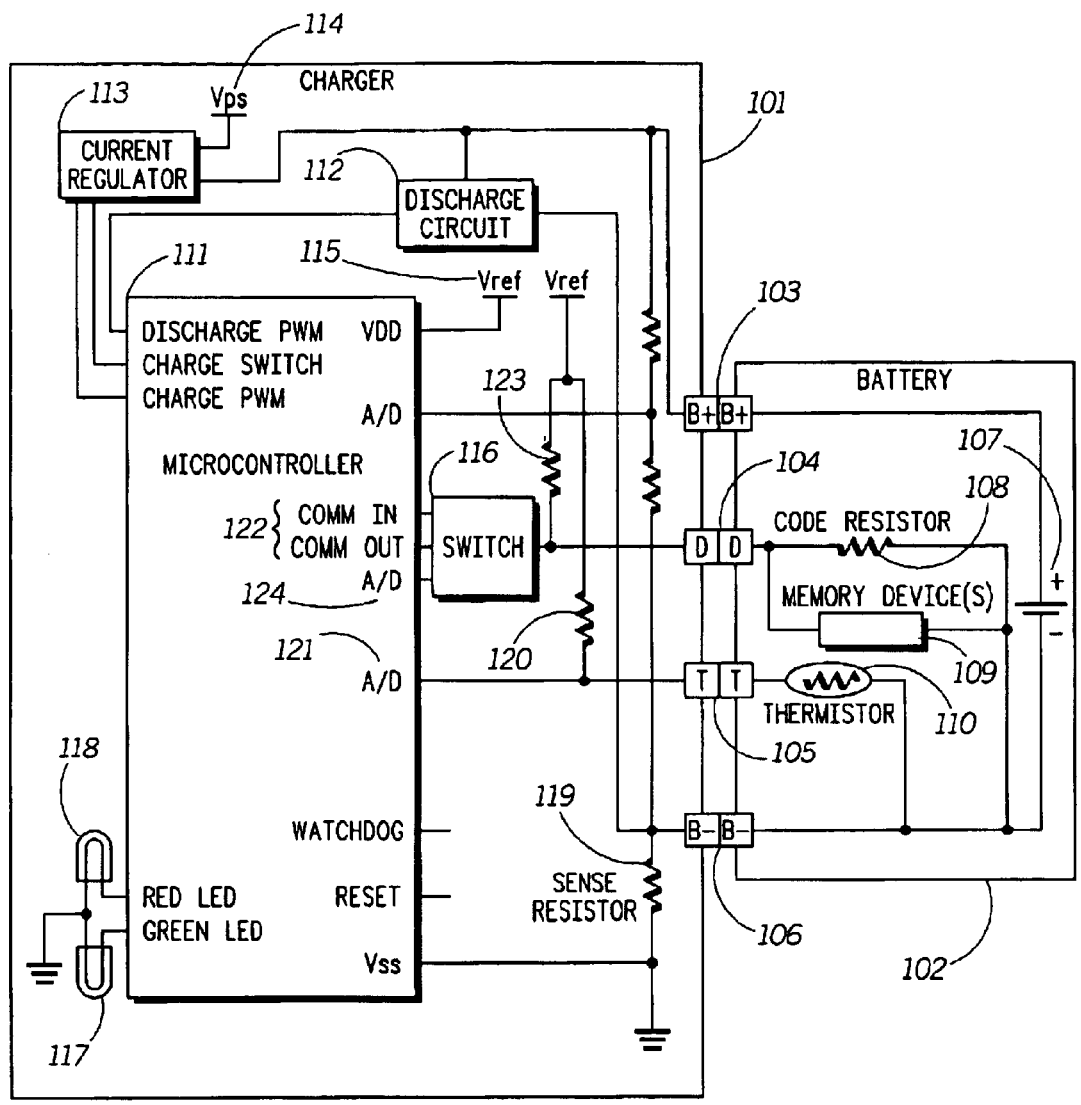
FIG. 1 illustrates a schematic block diagram of a preferred embodiment of a smart charger in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention includes an adaptor comprising a memory device. The adaptor couples mechanically and electrically to a non-smart battery. The adaptor includes a charger connection that is electrically and mechanically configured to couple to a smart charger. The adaptor also includes a battery connection that is electrically and mechanically configured to couple to a non-smart battery at the host side electrical contacts.

The memory device within the adaptor includes data that can be read by a smart charger. The data indicates that an adaptor is present. When read by a smart charger, the charger understands two things: First, that a non-smart battery has been coupled to the charger by way of an adaptor. Second, that the user desires to recondition the battery upon insertion.

When the battery-adaptor assembly is inserted into the smart charger, the smart charger immediately begins to recondition the battery by discharging it until the voltage across the battery pack has dropped below a predetermined threshold. The smart charger then proceeds to charge the battery with a constant current. Since the smart charger does not have access to any temperature sensing elements in the non-smart battery (e.g. a thermistor), the smart charger terminates charging by way of a "V-peak" algorithm, which is also sometimes referred to as a "delta-v" or, more accurately, "minus delta-V" algorithm. (V-peak charge termination is well known in the art. Essentially, as the amount of energy stored in the battery increases, the voltage across the cells also increases. Once the battery approaches full charge, this voltage increase slows. V-peak charge termination terminates charge current when a negative inflection (i.e. the slope of the voltage curve changes from positive to negative) in the voltage curve occurs. This is explained in greater detail below.)

Referring now to FIG. 1, illustrated therein is a schematic block diagram of a preferred embodiment of a smart charger in accordance with the invention. A smart battery 102 is included for illustration purposes. The smart battery 102 includes at least one rechargeable cell 107 and is shown coupled to the smart charger 101. (For convenience, the at least one rechargeable cell 107 will be herein referred to as a "cell", although it will be clear to those of ordinary skill in the art that "cell" could be one or more cells.) The smart charger has a microprocessor 111 disposed within. The smart battery/smart charger coupling is achieved through mating contacts Battery+ 103, Data 104, Thermistor 105 and Battery− 106.

The smart battery 102 also contains a thermistor 110 for sensing the temperature of the cell, an optional code resistor 108 which has an impedance that corresponds to a particular cell, and a memory device 109 that holds battery information, including serial number, type of cell, charging instructions, data parameters, charge usage histogram, date of manufacture, first date of use, and similar information. An example of such a memory device is the DS2502 manufactured by Dallas Semiconductor. Batteries of this construction are also taught in copending application Ser. No. 09/738,090, filed Dec. 15, 2000, entitled "Method and Mechanism to Prevent Corruption of Data", which is incorporated herein by reference in its entirety.

The smart charger 101 includes typical charging circuitry, including a current regulator 113, a power supply connection 114, a current sense resistor 119 and indicator light-emitting diodes (LEDs) 117 and 118. Note that only two LEDs are necessary to indicate three colors, as the red and green illuminated simultaneously gives off a yellow light.

When the smart battery 102 is placed in the pocket, causing connections 103–106 to close, the thermistor 110 causes the voltage at a first analog to digital (A/D) input 121 to change from Vref to Vref/X, where X is determined by the voltage divider of the pull-up resistor 120 and the thermistor 110. When the first A/D input 121 senses this change, the microprocessor 111 knows that a battery has been inserted into the pocket.

After insertion, the microprocessor 111 identifies the battery 102. This can be done in a variety of ways. One method is to read the memory device 109 via the communication ports 122 of the microprocessor 111. A second method is to determine the value of the coding resistor 108 by sensing the voltage formed by the resistor divider of pull-up resistor 123 and the code resistor 108 through the second A/D input 124. A switch 116 is optionally included to perform a multiplexing function, thereby allowing the microprocessor 111 to switch between a data communication mode and an analog mode. Essentially, the microprocessor 111 monitors the inputs 122,124 for both digital and analog information.

Once the battery 102 has been identified, the microprocessor reads the memory device 109 to decide if a reconditioning cycle is needed. If so, the microprocessor 111 enables the discharge circuit 112, which may be a simple resistor, to discharge the cell 107. The microprocessor 111 also notifies the user that the cell 107 is being reconditioned by actuating an enunciator, which may include illuminating one or more LEDs 117,118.

Figure 2:
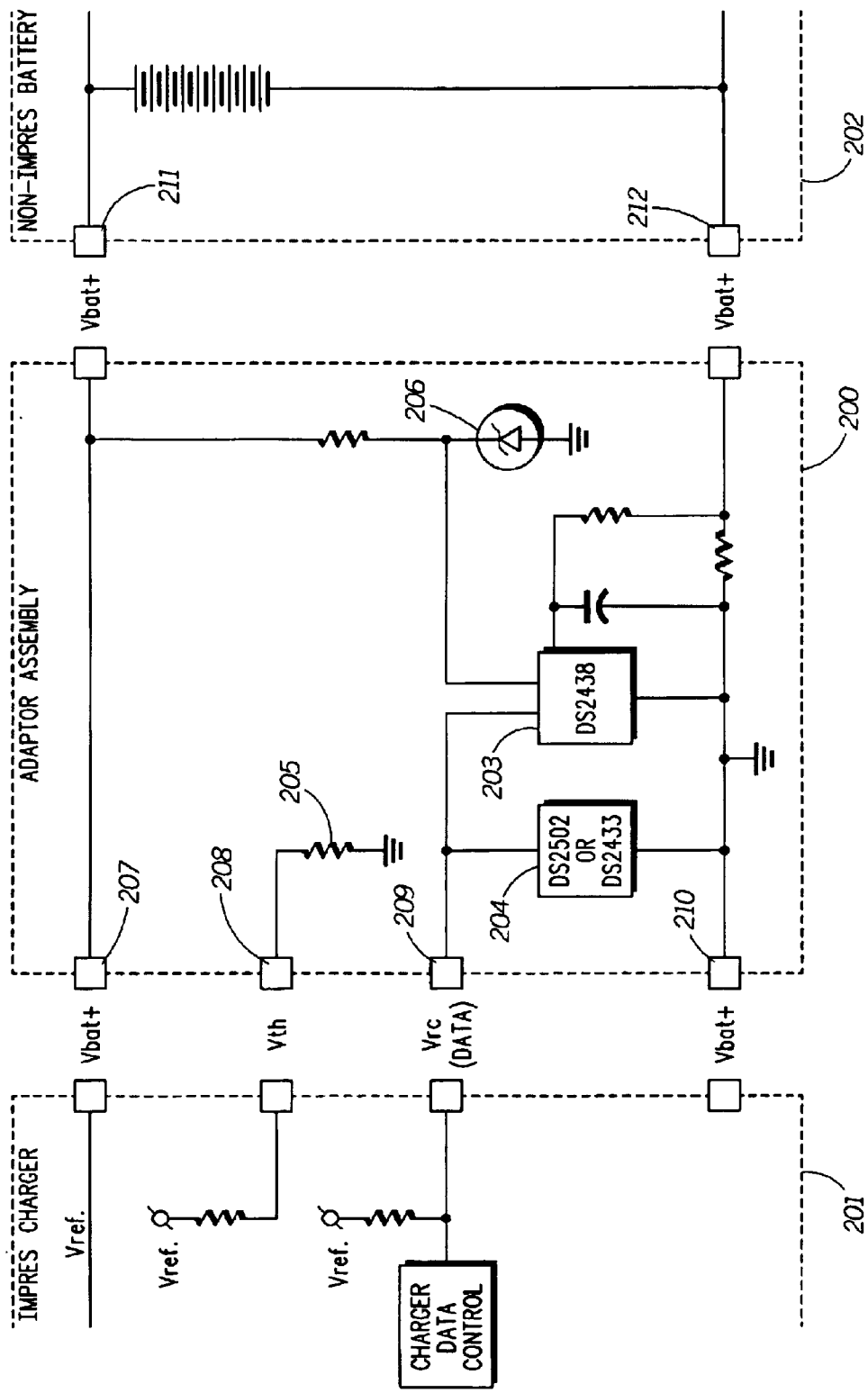
FIG. 2 illustrates one preferred embodiment of an adaptor that facilitates reconditioning of non-smart batteries by smart chargers in accordance with the invention.

As stated above, non-smart batteries do not include memory devices. Referring now to FIG. 2, illustrated therein is one preferred embodiment of an adaptor 200 that facilitates reconditioning of non-smart batteries 202 by smart chargers 201 in accordance with the invention. The adaptor 200 replicates the front end of a smart battery, in that four terminals 207–210 are presented to the charger. Terminal 208 provides a "pseudo thermistor" resistor 205, which has a resistance value that simulates a thermistor at a temperature that is within the charging window. (The charging window is preferably between 5 and 45 degrees Centigrade.) Note that some batteries are designed such that the adaptor may interface directly with the thermistor in the battery. In such a case, charging may terminate either using temperature data from the cells as read via the thermistor, or by way of the V-peak termination.

The adaptor 200 includes a compatible memory device 204, preferably an EEPROM. This memory device 204 provides a means of tagging a battery pack with a unique serial number. The memory device 204 further includes adaptor specific information and data. This data comprises, for example, the voltage at which the reconditioning cycle should be terminated and the V-peak termination information. The charger 201 reads the information stored in the memory device 204. This information tells the charger that there is a non-smart battery 202 coupled to the charger 201 by way of an adaptor 200. The charger 201 thus knows to begin a reconditioning cycle immediately, and then to charge with a constant current until a V-peak inflection occurs. A memory device 204 with write capabilities may be used to store diagnostic data about the non-smart battery 202 from the charger 201.

The adaptor 200 optionally includes an alternate memory device 203. This alternate memory device 203 may comprise a compatible EPROM or EEPROM, but is preferably a smart battery monitoring device like the DS2438 manufactured by Maxim. The DS2438 is a monitoring IC for smart batteries that includes several features. Specifically, the IC provides a means of tagging a battery pack with a unique serial number, a direct-to-digital temperature sensor, an A/D converter, a current accumulator, and 40 bytes of nonvolatile EEPROM memory. Thus, while a compatible memory device is acceptable, a smart battery monitoring device is preferable due to the additional features that are coupled with the memory space. The memory device 203 and alternate memory device 204 may be powered from a voltage reference 206 in the adaptor 200. Some memory ICs, like the DS2502, manufactured by Maxim, will not need such a reference 206 as they use parasitic power (taken from the data line) for operation.

Many non-smart batteries include blocking diodes that prevent current from flowing from the battery into the charger. For this reason, the adaptor 200 is preferably designed to couple to the host device contacts 211,212, rather than the charger contacts (not shown). To explain another way, many non-smart batteries for devices like two-way radios have two sets of electrical contacts: one set for coupling directly to a charger; and another set for coupling to the host device. The contacts for coupling to the charger generally include a serial diode that only allows current to flow from the charger to the battery (to prevent the charger from acting as a load on the battery). Such a diode prevents reconditioning through the charger contacts. The host device contacts, however, are capable of both sourcing and sinking current. Thus, the adaptor 200 preferably mates with the host device contacts 211,212 to bypass any blocking diode.

Figure 3:
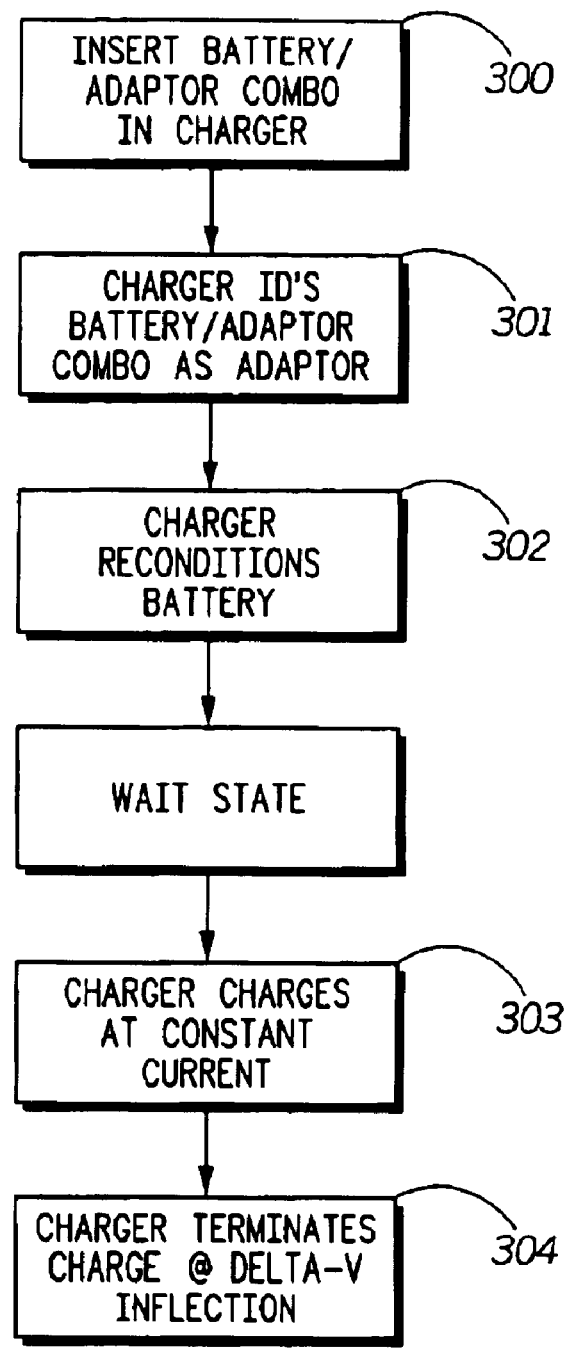
FIG. 3 illustrates one preferred method of dealing with a non-smart battery when coupled to a smart charger by way of an adaptor.

Referring now to FIG. 3, illustrated therein is one preferred method of dealing with a non-smart battery when coupled to a smart charger by way of an adaptor. The battery/adaptor assembly is first inserted into the charger at step 300. The charger then identifies the battery/adaptor at step 301 as including an adaptor by way of the memory device disposed within the adaptor. The charger then begins the reconditioning cycle at step 302. Once the reconditioning is complete, the charger begins charging the battery at a constant current at step 303. When a V-peak inflection occurs at step 304, the charger terminates the charging process.

Figure 4:
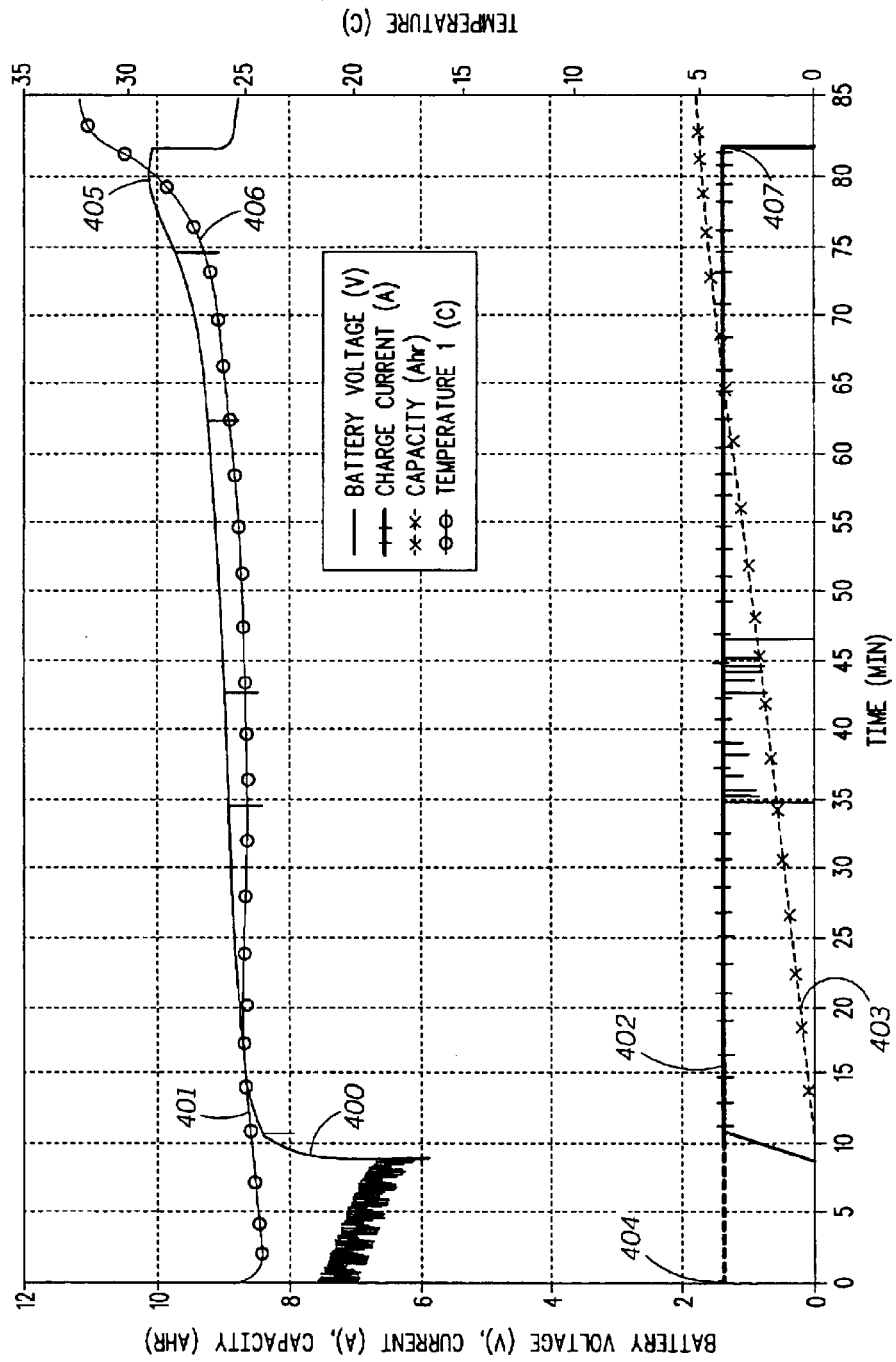
FIG. 4 illustrates a charging curve demonstrating the adaptor battery combination in a smart charger.

Referring now to FIG. 4, illustrated therein is a charging curve demonstrating the adaptor battery combination in a smart charger. The curves in FIG. 4 also illustrate the V-peak charging termination. FIG. 4 includes four curves: a voltage curve 400, a temperature curve 401, a current curve 402 and a capacity curve 403. The voltage curve 400 measures the voltage across the cells in the battery, and is for informational purposes only.

The battery begins charging at a constant current 404. As this occurs, the voltage curve 400 slowly increases, as does the capacity curve 403. When the battery nears full capacity, the temperature increases at point 406. The charger continues to charge at a constant current until the voltage incurs a negative inflection at point 405. Note that positive inflections could be used to terminate charge as well, but the negative inflection is preferred as it occurs nearer full capacity. Once the negative inflection, i.e. the V-peak inflection occurs, the charging current terminates at point 407.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. An adaptor for charging a non-smart battery in a smart charger, comprising:
   a. a first set of electrical contacts for coupling to the smart charger;
   b. a second set of electrical contacts for coupling to the non-smart battery;
   c. at least one memory device coupled to at least one of the first set of electrical contacts;
   d. data stored within the at least one memory device, the data including instructions to recondition the non-smart battery; and
   e. a resistor coupled to one of the first set of electrical contacts, wherein the resistor has an impedance value corresponding to a thermistor impedance when the thermistor is between 5 and 45 degrees Centigrade;
   wherein when the adaptor is coupled to the non-smart battery and inserted into the smart charger, the smart charger reconditions the non-smart battery.

2. The adaptor of claim 1, wherein when the reconditioning of the non-smart battery is complete, the smart charger commences charging the non-smart battery.

3. The adaptor of claim 2, wherein the charging of the non-smart battery terminates when the smart charger detects a V-peak inflection.

4. The adaptor of claim 3, further comprising an alternate memory device.

5. The adaptor of claim 4, further comprising a voltage reference coupled to the at least one memory device.

6. The adaptor of claim 1, wherein the data stored within the at least one memory device includes instructions for a smart charger to execute a method, the method comprising the following steps:
   a. recondition the non-smart battery by discharging the battery to a predetermined voltage;
   b. charge the battery; and
   c. terminate charge current once a V-peak inflection occurs.

* * * * *